US 6,534,145 B1

(12) United States Patent
Boyles (10) Patent No.: US 6,534,145 B1
(45) Date of Patent: Mar. 18, 2003

(54) PLEATED NONWOVEN PRODUCTS AND METHODS OF CONSTRUCTING SUCH PRODUCTS

(75) Inventor: David Boyles, Carlisle, PA (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/181,404

(22) Filed: Oct. 28, 1998

(51) Int. Cl.$^7$ ................................. B32B 3/26
(52) U.S. Cl. .................... 428/92; 428/181; 428/182
(58) Field of Search ................... 428/181, 182, 428/92, 85, 93; 156/72

(56) References Cited

U.S. PATENT DOCUMENTS

| | | | | |
|---|---|---|---|---|
| 793,870 A | * | 7/1905 | Beale | 428/181 |
| 2,101,905 A | * | 12/1937 | Hopkinson | 15/226 |
| 3,174,451 A | * | 3/1965 | Heiks | 112/410 |
| 3,679,533 A | * | 7/1972 | Fukuda et al. | 428/93 |
| 5,560,972 A | * | 10/1996 | Blakely et al. | 428/93 |
| 5,955,174 A | * | 9/1999 | Wadsworth et al. | 428/181 |

* cited by examiner

*Primary Examiner*—Elizabeth M. Cole
(74) *Attorney, Agent, or Firm*—Wood, Herron & Evans LLP (57) ABSTRACT

A pleated nonwoven product and method of constructing such a product which is particularly suitable for various automotive applications. The product is formed from a fibrous mat with the fibers within each pleat extending substantially vertically when the mat is in a horizontal orientation. Various products may be formed from the pleated nonwoven mat including automotive carpets and underpads, trim parts, trunk liners, upholstery, engine compartment liners, and sound insulators. Additional embodiments of the invention utilize a split pleated product presenting a unique automotive textile, carpet or other upholstery product and a unitary carpet and underpad product utilizing the pleated product of the invention.

8 Claims, 9 Drawing Sheets

PLEATED NONWOVEN PRODUCTS AND METHODS OF CONSTRUCTING SUCH PRODUCTS

FIELD OF THE INVENTION

The present invention relates generally to fibrous mat products and, more particularly, to corrugated or pleated products taking the general form of a mat.

BACKGROUND OF THE INVENTION

Various products are used as thermal insulators, sound insulators or as other more structurally supportive members, for example, in automotive applications. For example, so-called cross-lapped materials are fibrous mats formed of fibers oriented with their lengthwise dimension extending parallel to the plane of the mat. These materials often function as sound insulators, for example, in the dashboard or other areas of an automotive interior. Cross-lapped materials do not function well as pads or underlayments, for example, beneath a carpet because of their limited resilience or ability to compress. Often, various compressible foams will serve as supports or padding in those areas of a vehicle requiring increased cushioning.

Although various types of corrugated or pleated nonwoven fibrous materials are known, there is still a need to optimize the combined characteristics of sound absorption and resilience, especially in automotive applications. Examples are found in U.S. Pat. Nos. 4,576,853; 4,948,661; 4,950,439; 5,011,737; and 5,071,608. The prior pleated nonwoven materials may be used in a variety of specific applications, but are still in need of improvements relative to automotive applications. These applications may require high sound absorption characteristics and/or a high level of resilience or cushioning as well as other features.

Automotive textile products, such as carpets and body cloths, present another area of continued development. Automotive carpet products generally take two forms including nonwoven carpets and tufted carpets. In general, nonwoven carpets provide a lower cost alternative to tufted carpets. Thus, while tufted carpets typically provide a more plush and desirable surface within a vehicle interior or trunk, they also involve higher manufacturing costs which may be passed on to the consumer. Body cloths come in woven and nonwoven forms and may include items such as seat facings, upholstery and headliners. It would therefore be desirable to provide a lower cost automotive textile product having surface characteristics similar to a typical tufted carpet or knit velours.

SUMMARY OF THE INVENTION

The present invention generally provides a pleated or corrugated nonwoven product formed of natural or synthetic fibers, or combinations of both types of fibers. The product is initially formed as a pleated mat and may be formed in various thicknesses according to the intended application. In accordance with the invention, the fibers are oriented substantially vertically within each pleat of the product. It will be understood that the terms horizontal and vertical will be used relative to a mat of this invention which is laid out flat in a horizontal orientation. Of course, products formed in accordance with this invention may utilize pleated nonwoven mats ultimately oriented in any direction. In each case, however, the fibers forming each pleat extend in the direction of the pleat when viewed in transverse cross section. In conjunction with the type and size of the fibers, this results in a highly resilient and versatile mat suitable for a wide variety of uses and additional forming processes, such as thermoforming or compression forming.

Preferably, the pleated nonwoven product of this invention is formed by carding a plurality of fibers and then pleating the carded fibers with a pleating machine. More particularly, the fibers are carded onto a conveyor belt associated with the pleating machine such that the fibers extend in the machine direction or, in other words, direction of movement of the conveyor belt. The pleating machine orients the fibers perpendicularly, i.e., vertically, when forming the pleats. It is particularly desirable to have 90% of the fibers oriented substantially vertically within each pleat to optimize resilience at least in those cases in which the ultimate product will be used in a flat, generally uncontoured state, or in those applications in which the product is contoured in the machine direction. If the product will ultimately be contoured in a direction transverse to the machine direction, it is preferred that about 30% of the fibers extend in this transverse direction to help bind the product together during contouring. Various types of natural and synthetic fibers, as well as blends thereof, may be used to form the pleated products of this invention. Some examples of suitable fiber materials include nylon, polyethylene, polyester, polypropylene and cotton. The fibers may optionally include heat activated binders or other binders, or the pleats may be mechanically bound together during the pleating process, for example, using needles inserted transversely to the pleats and causing fibers of adjacent pleats to intertwine. Fiber blends and/or weights may be chosen to optimize resilience or sound absorption, or to optimize both of these characteristics. Natural fibers deliver better sound absorption capabilities, while pleated mats formed at least partially of synthetic, thermoplastic fibers may be thermoformed into desired three-dimensional shapes.

More specifically, pleated nonwoven products of the present invention are heated and molded under relatively low pressure, for example, to form various three-dimensionally shaped automotive interior parts, trunk liners and engine compartment liners. For example, a product of this invention may be molded and compressed in discrete areas to shape the product in the form of an automotive floor pan so that it may be used as a carpet or carpet pad. Relatively small presses, such as presses of less than ten tons, may be used for these molding or thermoforming processes. Typical insulator materials formed of cross-lapped fibers may require presses rated at 100 tons and above. Also, because fibers in typical insulators are randomly oriented, there may be a significant loss in acoustic absorption abilities during a molding or compression process. With the pleated product of this invention, the loss in acoustic properties generally should be less due to the physical characteristics of the product, i.e., the high loft and substantially vertical fiber orientation.

The present invention further contemplates a cost efficient, automotive textile product such as a carpet or body cloth preferably formed with the pleated nonwoven product or mat of the present invention. Specifically, the pleated nonwoven product may include a suitable backing for the desired end use on each of its major faces. Preferably, this backing may be a conventional back coating or backing used for automotive textiles, such as a backing that includes extruded polyethylene or polypropylene, or polymeric dispersions. Preferably after the backings are applied, the product is split centrally between the two backings to form mirror image textile products. The cut surfaces of the interior pleated layer simulate a tufted carpet surface. This procedure also results in a moldable or thermoformable automotive textile product capable of being produced at high speed. Moreover, in accordance with the invention, the resulting product may be selectively heated and compressed along its upper surface as necessitated by particular applications.

These and other objects, advantages and features of the invention will become more readily apparent to those of ordinary skill in the art upon review of the following detailed description taken in conjunction with the accompanying drawings.

DETAILED DESCRIPTION OF THE PREFERRED EMBODIMENTS

Figure 1:
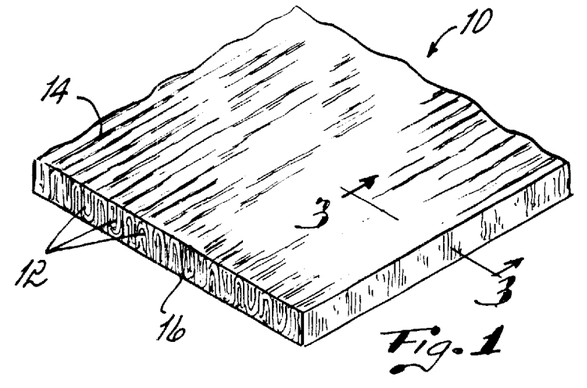
FIG. 1 is a perspective view of a pleated nonwoven product, particularly in the form of a flat mat, and constructed in accordance with the invention.

Referring generally to FIG. 1, a nonwoven pleated product generally taking the form of a flat mat 10 includes a plurality of pleats 12 extending between major faces 14, 16. Pleats 12, as will be discussed further below, extend vertically, or perpendicularly, between faces 14, 16. The pleated nonwoven product 10 may be formed of many types of natural and synthetic fibers and may be formed into various products and, particularly, automotive products including underpads, carpets, dash insulators, door insulators, headliners and other sound insulation applications in the trunk or engine compartment. Various synthetic or natural fibers, or combinations of both, may be used to construct product 10. Specific fiber types used in the preferred embodiments include nylon, cotton, polyethylene, polyester and polypropylene.

The preferred pleating machine for forming a carded assembly of fibers into the pleated product shown in FIG. 1 is sold under the name Struto, manufactured by Industrial Nonwoven Technology Limited, Liberec, Czechoslovakia Republic. Another acceptable pleating machine is shown in U.S. Pat. No. 4,111,733.

Figure 2:
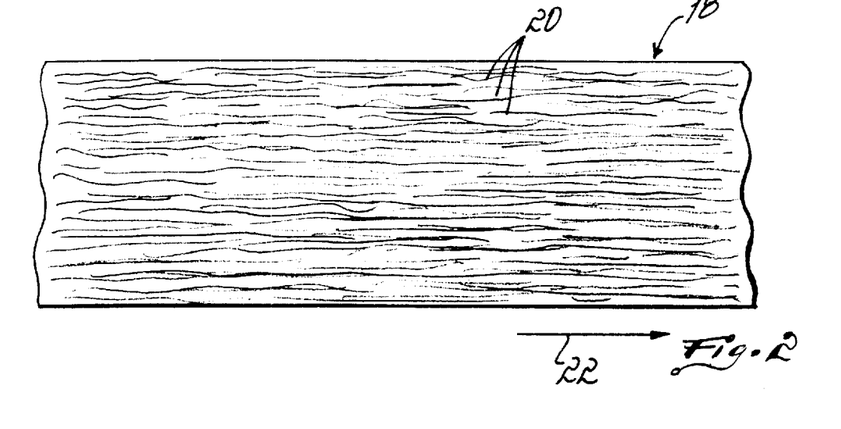
FIG. 2 is a top view showing fibers carded onto a moving conveyor.
Figure 2A:
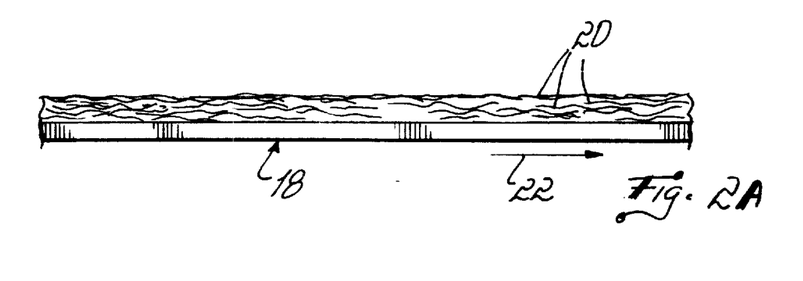
FIG. 2A is a side view showing the conveyor and fibers of FIG. 2.
Figure 3:
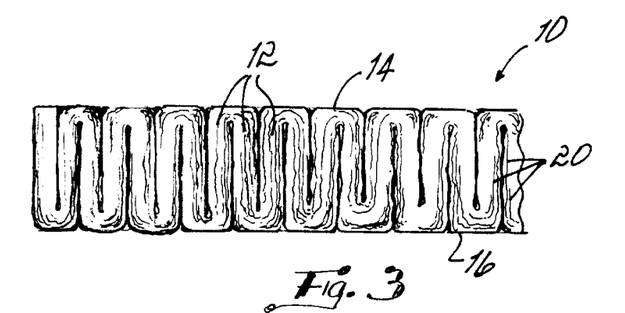
FIG. 3 is a cross section taken along line 3—3 of FIG. 1.

FIGS. 2 and 2A schematically illustrate a conveyor 18 holding a carded web of fibers 20 and moving in a direction 22. As shown, the fibers 20 extend substantially parallel to the direction of movement 22 associated with conveyor 18. Conveyor 18 moves into a pleating or corrugating section of an apparatus as disclosed above and, due to the orientation of fibers 20 as shown in FIGS. 2 and 2A, fibers 20 become reoriented within each pleat 12 into a substantially vertical orientation. This orientation is best illustrated in FIG. 3. Most preferably, fibers 20 are oriented vertically as illustrated in FIG. 3 or at least not more than 30° from vertical. The individual pleats may be bonded together thermally within an oven, or using liquid binders applied to the carded web prior to pleating, or mechanically using barbed needles which pass through adjacent pleats during the pleating operation.

Figure 4:
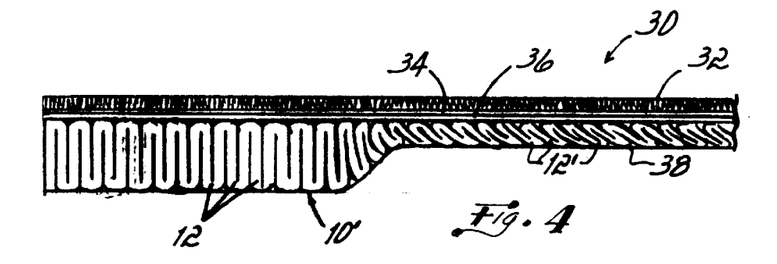
FIG. 4 is a side elevational view of a carpet product utilizing the pleated nonwoven product of this invention as padding in a unitary structure.

FIG. 4 illustrates an alternative embodiment of the invention taking the form of a carpet product 30. Carpet product 30 includes an upper carpet layer 32, which may be a nonwoven carpet or a tufted carpet, and first and second backing layers 34, 36. Backing layer 34 may be a primary backing through which carpet layer 32 is tufted, while backing layer 36 may be a secondary backing, for example, formed of a thermoplastic such as polyethylene, polypropylene or ethylene vinyl acetate. A modified version of the pleated nonwoven product 10' of the present invention is bonded to secondary backing layer 36. Pleated nonwoven product 10' is substantially the same as product 10 discussed above, but includes a thermally compressed portion 38 to illustrate the molding capabilities of the present invention. Specifically, when formed of suitable thermoplastic fibers, a relatively low tonnage press, including a heated platen, may be used to permanently compress and deform pleats 12' as shown. Thus, in the manner generally illustrated in FIG. 4, a combined carpet product and underpad may be suitably cut and thermoformed into a three-dimensional shape, using conventional carpet thermoforming equipment, to conform to the shape of an automotive interior floor pan. Of course, various other applications for this feature of the invention are possible as well, including other automotive applications within a vehicle cabin or trunk.

Figure 5:
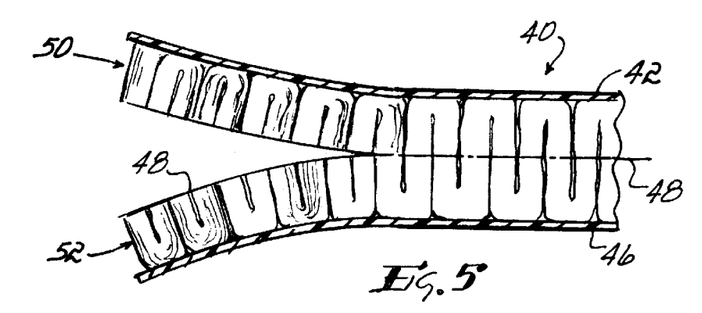
FIG. 5 is a cross sectional view schematically illustrating the construction of a carpet product in accordance with the invention.
Figure 6:
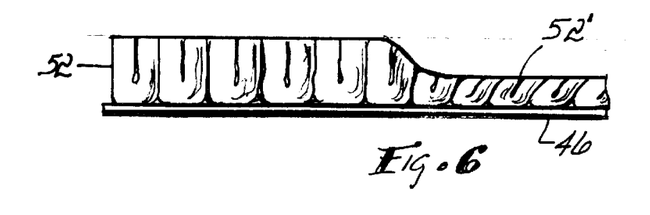
FIG. 6 is a cross sectional view of the carpet product formed in accordance with FIG. 5 and further having a permanently compressed region.

FIGS. 5 and 6 illustrate another embodiment of the invention in which a pleated nonwoven product is used to form a product particularly useful as an automotive carpet but also useful in other applications. More specifically, FIG. 5 illustrates a product 40 comprised of a backing layer 42, an intermediate nonwoven pleated layer 44 and another backing layer 46. Backing layers 42, 46 are preferably extruded thermoplastic material, such as polyethylene or polypropylene materials for molded textile products or polymer dispersions for flat textile products. Although not necessary to this feature of the invention, pleated layer 44 may be constructed the same as pleated nonwoven product 10 discussed above. In accordance with this feature, and as schematically illustrated in FIG. 5, intermediate pleated layer 44 is preferably split along a central plane 48 to create two mirror image carpet products 50, 52 comprised of half pleats 51, 53 connected, respectively, to backing layers 42, 46 after splitting. Although referred to as carpet products 50, 52 it will be appreciated that these products may also be used as other unique upholstery or interior automotive trim surfaces. As further shown in FIG. 6, a resulting carpet product 52 may be further processed by thermoforming in various manners. This may include forming a permanently compressed region 52' in a manner similar to that described above with respect to FIG. 4. It may also or alternatively include thermoforming the entire carpet product including half pleats 53 and backing 46 into a three-dimensional shape to conform to a support surface, such as a floor pan. Any thermoforming performed in accordance with the present invention may be carried out using conventional technology. The required compression time, pressure and heat will vary depending primarily on material type and weight as will be appreciated by those of ordinary skill in the art. For example, a product formed of 100% polyester fiber at 15 denier, and having a backing formed of polyethylene, can require 5–6 psi at 400° F. for a time period of 30–45 seconds.

Figure 7:
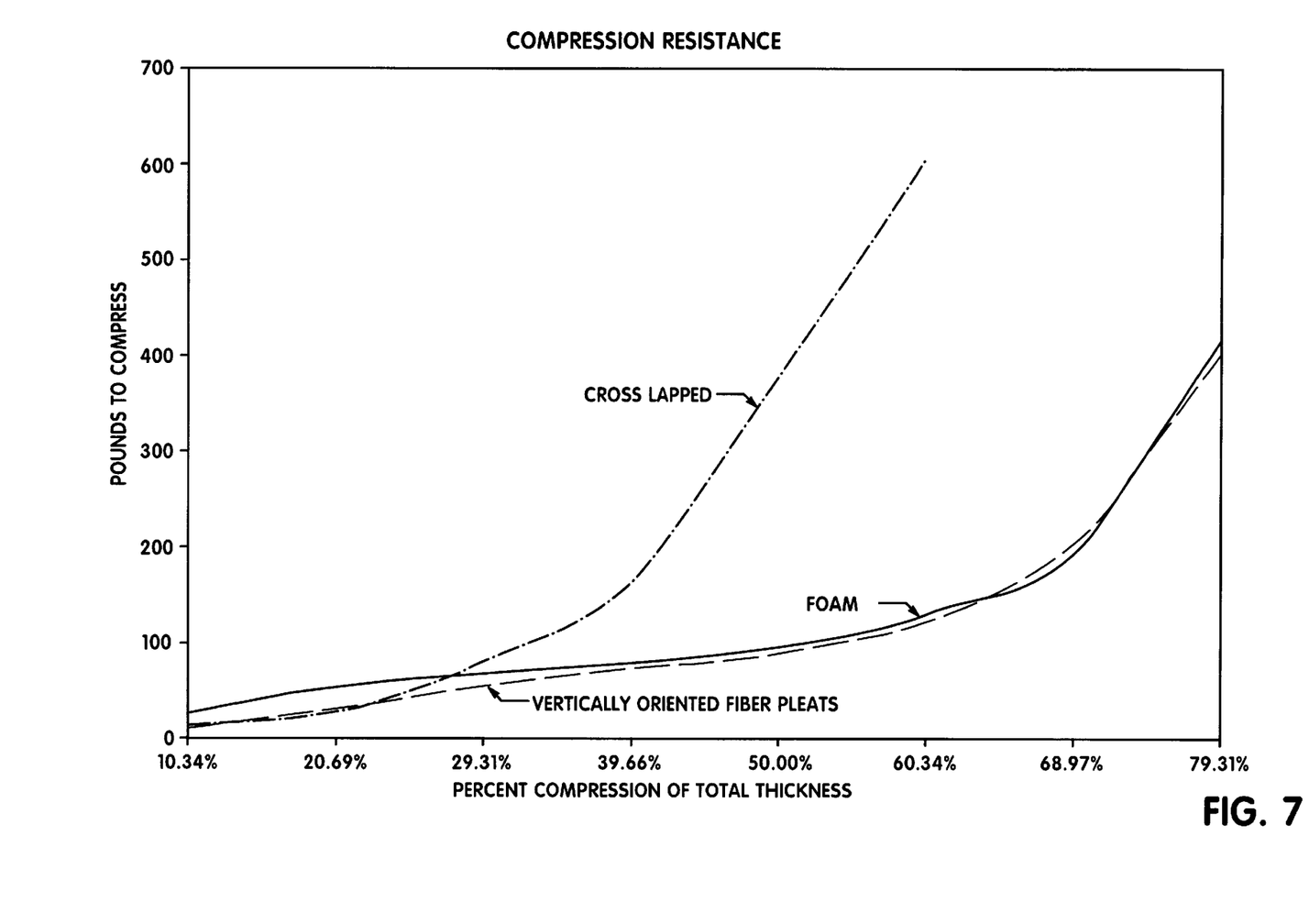
FIG. 7 illustrates a graph comparing the compression resistance of conventional cross-lapped and foam materials to the vertically oriented fiber pleats of the present invention.

FIG. 7 illustrates a graph comparing the compression resistance of cross-lapped and urethane foam materials with a pleated nonwoven product formed in accordance with FIGS. 1–3. More specifically, the cross-lapped product was a ¾ inch thick pad of polyester and nylon fibers. The foam material was a ¾ inch thick pad of cast urethane foam having a density of 3 pounds per cubic foot. The vertically oriented fiber pleats of the present invention were formed of 80% polyester fibers by weight and 0% co-polyester fibrous binder in the form of a ¾ inch thick pad having a weight of 1250 grams/m². This graph illustrates that the compression resistance characteristics of the invention closely approximate those of the cast urethane foam pad. Advantageously, however, the pad of the present invention is 30% lighter in weight than the cast urethane foam and presents a less expensive alternative to foam. On the other hand, the cross-lapped pad loses its compression characteristics rapidly beginning at about 40% compression of total thickness. For this reason, cross-lapped pads may serve as sound insulation, however, these pads are not desirable as a carpet underpad.

Figure 8:
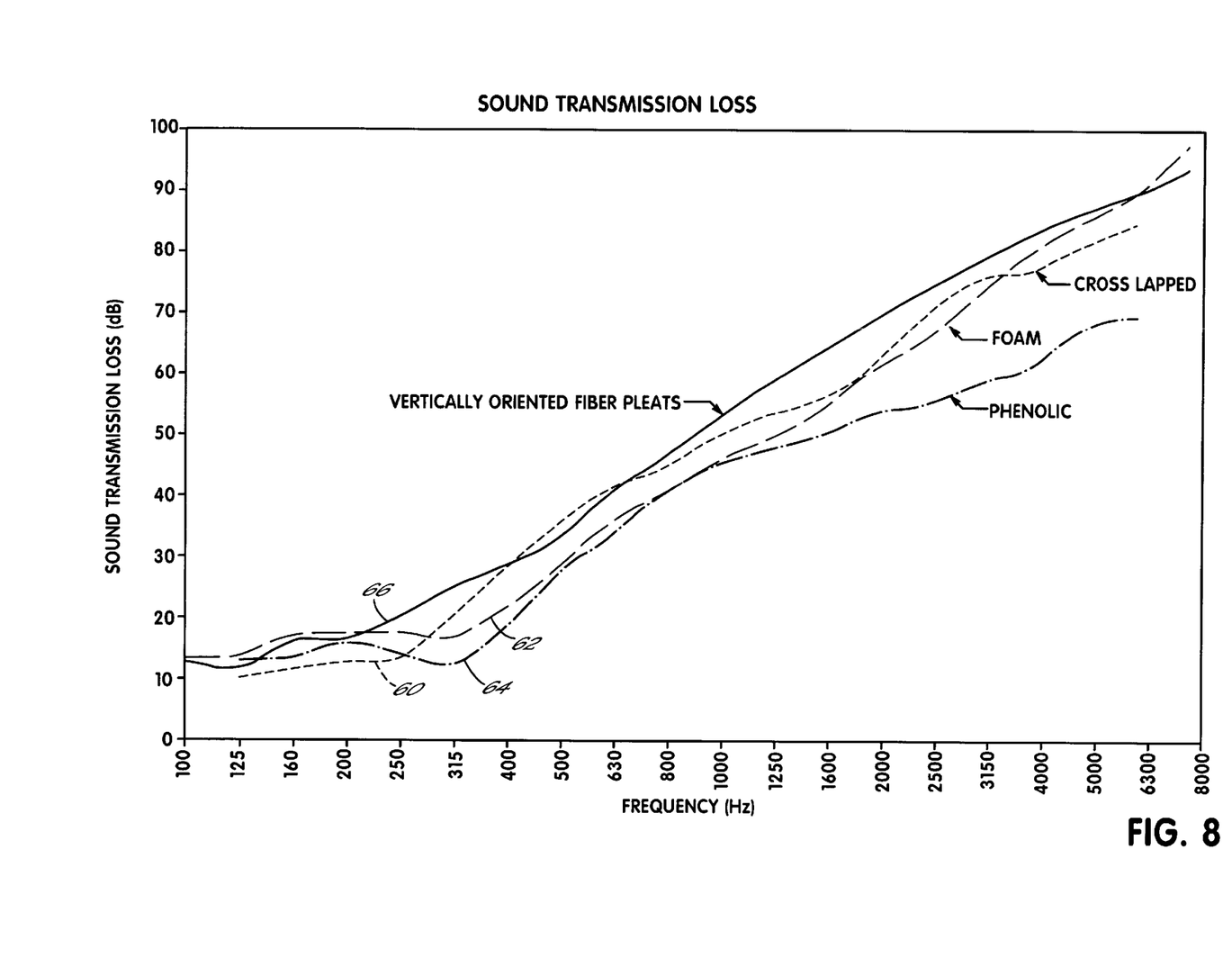
FIG. 8 illustrates a graph comparing the sound transmission losses of conventional cross-lapped, foam and phenolic materials with the vertically oriented fiber pleats of the invention.

FIG. 8 illustrates a graph comparing the sound transmission loss of a vertically oriented fiber pleated pad constructed in accordance with FIGS. 1 and 3 relative to cross-lapped, foam and phenolic materials. The measurement of sound transmission loss refers to measuring the amount of sound directed at the material which does not pass through the material. The cross-lapped and foam materials are of the same type as described above with respect to FIG. 7, while the phenolic material was a typical carpet insulating pad and comprised a ¾ inch thick phenolic resin-bonded pad composed of natural and synthetic fibers. Importantly, points 60, 62, 64 and 66 represent the double wall transmission loss dip in the curve and, for noise to be less noticeable to the human ear, these points should be as far left as possible on the frequency scale. As indicated in the graph, this point for the pleated product of this invention is farther left or, in other words, located at a lower frequency, than the other conventional materials. Also, a reduced decibel drop at that frequency translates into less noticeable noise. Finally, a curve which better approximates a straight line represents better sound absorption characteristics and, as indicated in FIG. 8, the vertically oriented fiber pleats therefore indicate the best sound absorption characteristics of the group.

FIGS. 9–13 illustrate various graphs plotting sound absorption coefficients versus frequency for a variety of pleated nonwoven materials constructed in accordance with FIGS. 1 and 3. In each case two identical "A" samples were compared to two identical "B" samples for control purposes. The sound absorption coefficient refers to the amount of sound that is absorbed by a material and not reflected back into the space containing the source of the sound. With respect to each graph, the test samples were comprised of ¾ inch thick pads of material.

Figure 9:
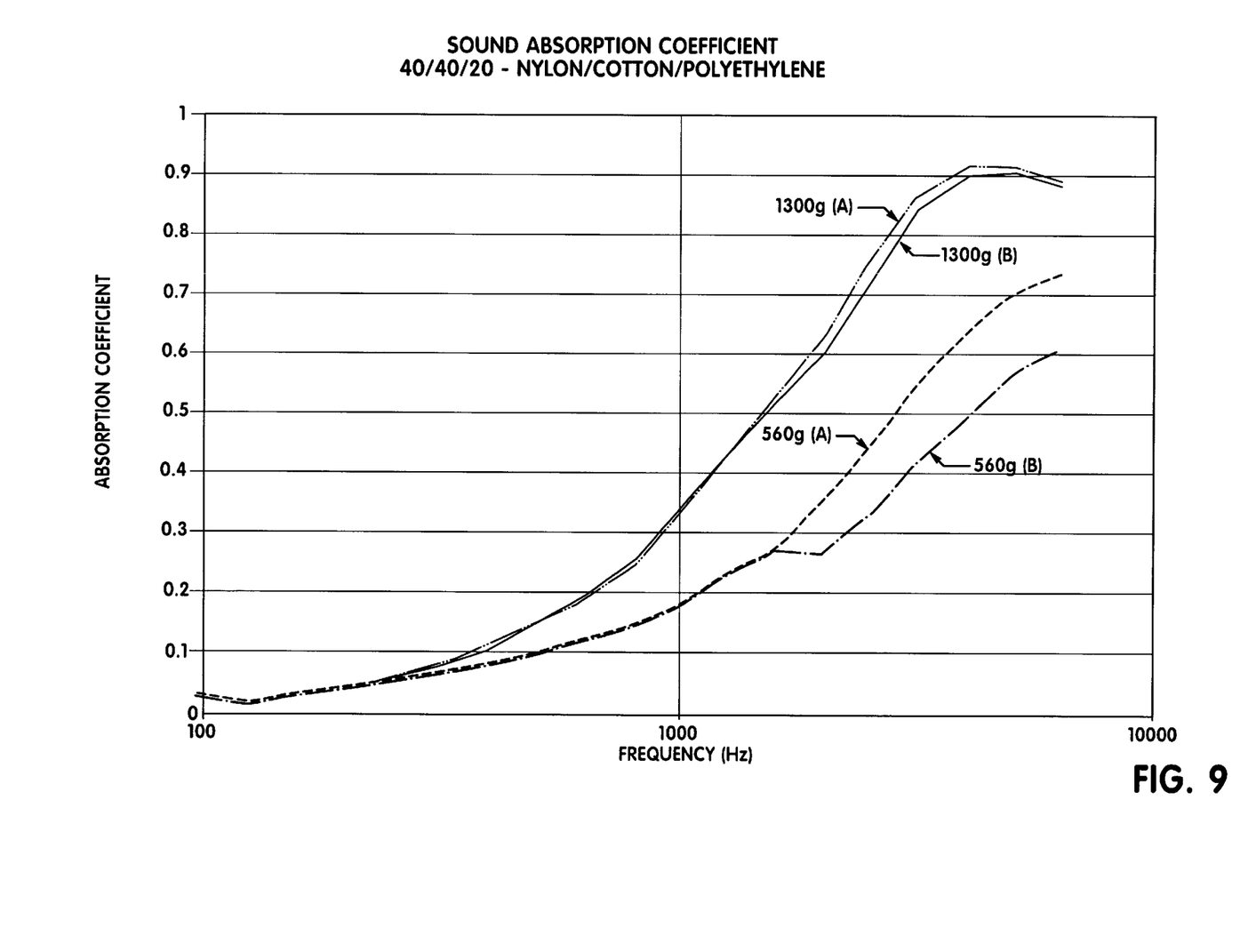
FIG. 9 illustrates a graph comparing the sound absorption coefficients of lightweight and heavyweight pleated materials of the invention formed of nylon/cotton/polyethylene fibers.

More specifically, FIG. 9 compares two 560 gram/m² samples of the invention with two 1300 gram/m² samples of the invention. The pleated nonwoven product specifically comprised nylon fibers (40 weight percent), cotton fibers (40 weight percent), and polyethylene fibers (20 weight percent). The graph of FIG. 9, taken alone, indicates that heavier weight pads of the invention will produce better sound absorption characteristics than lower weight pads of the invention. This characteristic holds true for each of the test procedures represented in FIGS. 9–13.

Figure 10:
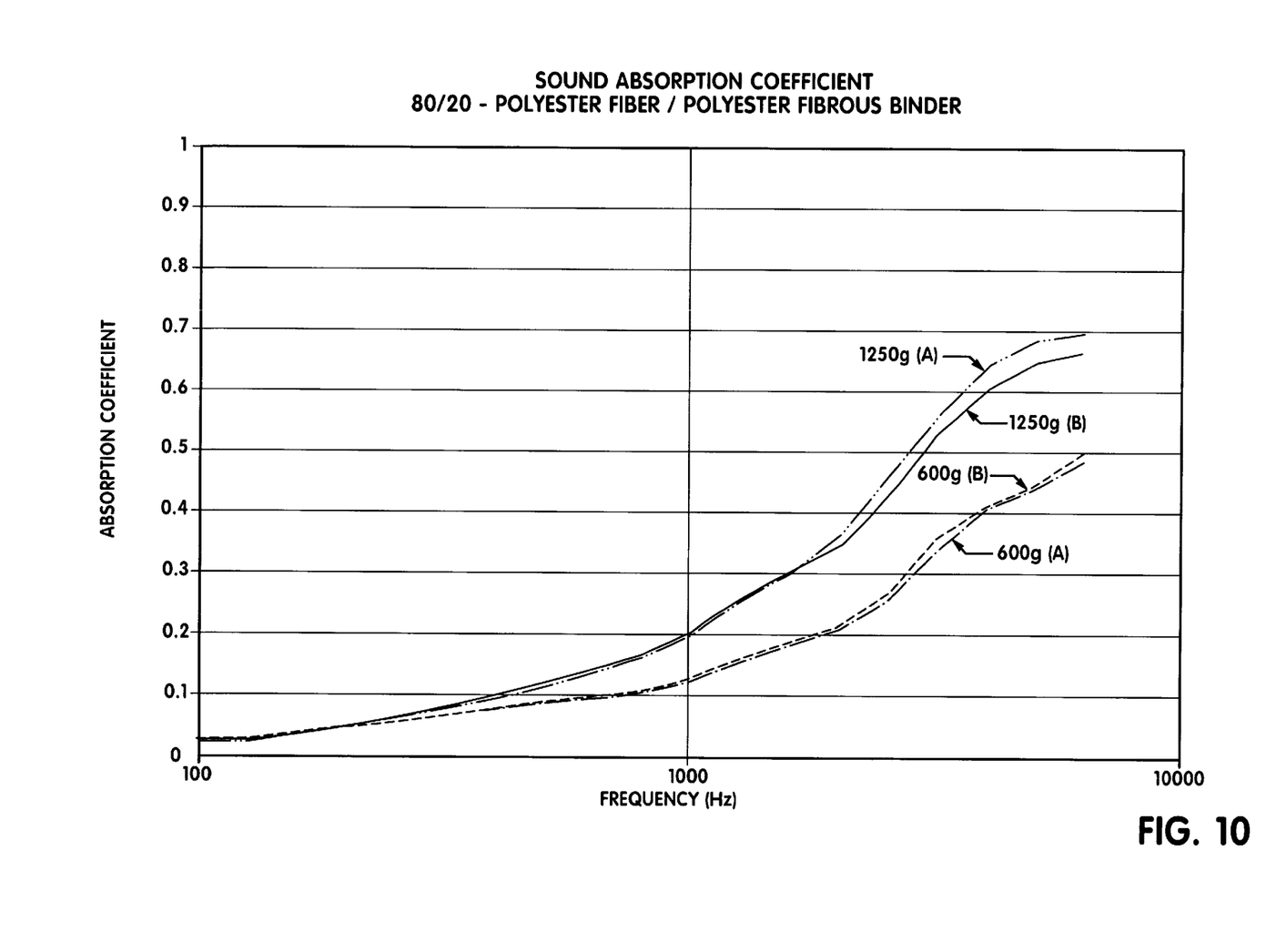
FIG. 10 illustrates a graph comparing the sound absorption coefficients of lightweight and heavyweight pleated materials of the present invention formed of polyester fiber and polyester fibrous binder.

FIG. 10 compares two 600 gram/m² samples of the invention with two 1250 gram/m² samples of the invention. The pleated nonwoven product specifically comprised polyester fibers (80 weight percent) and polyester fibrous binder (20 weight percent). This graph illustrates the improvement of the sound absorption characteristics with weight, as mentioned above, and also evidences that the inclusion of natural fibers, i.e., cotton fibers, results in equivalent sound absorption characteristics at lower product weights. This is also beneficial in that natural fibers, such as cotton, generally cost less than typical synthetic fibers used in these applications.

Figure 11:
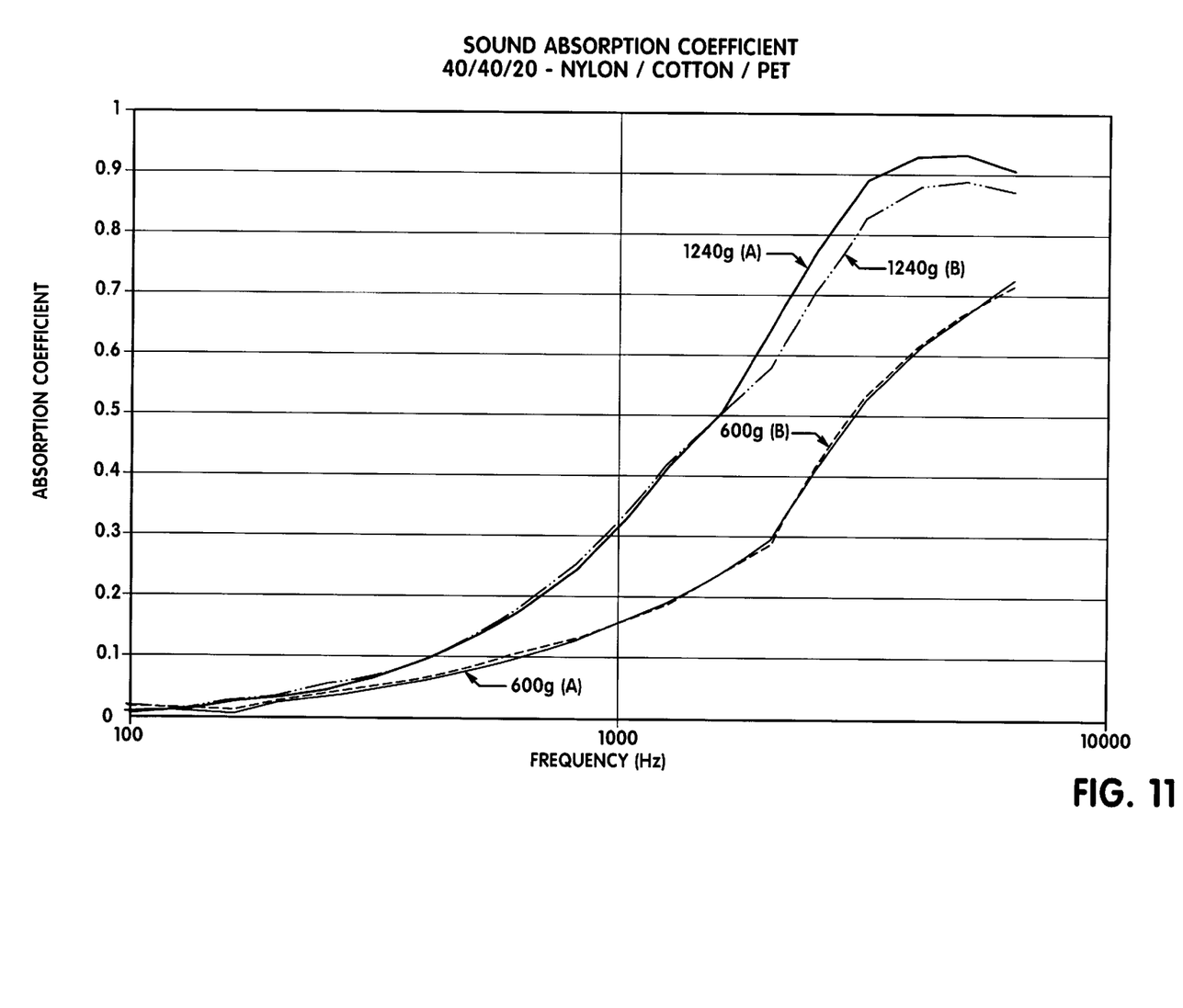
FIG. 11 illustrates a graph comparing the sound absorption coefficients of lightweight and heavyweight pleated materials of the present invention formed of nylon/cotton/PET fibers.

FIG. 11 compares two 600 gram/m² samples of the invention with two 1240 gram/m² samples of the invention. The pleated nonwoven product specifically comprised nylon fibers (40 weight percent), cotton fibers (40 gram weight) and PET fibers (20 weight percent). The graph of FIG. 11 illustrates essentially the same general characteristics as FIG. 9, but when compared to FIG. 9, FIG. 11 illustrates that the number of binding points or type of binder does not have a significant effect on the absorption characteristics. Polyethylene will have more binding points than PET. Also, a 100% increase in the natural fiber content of the product does not improve the absorption characteristics.

Figure 12:
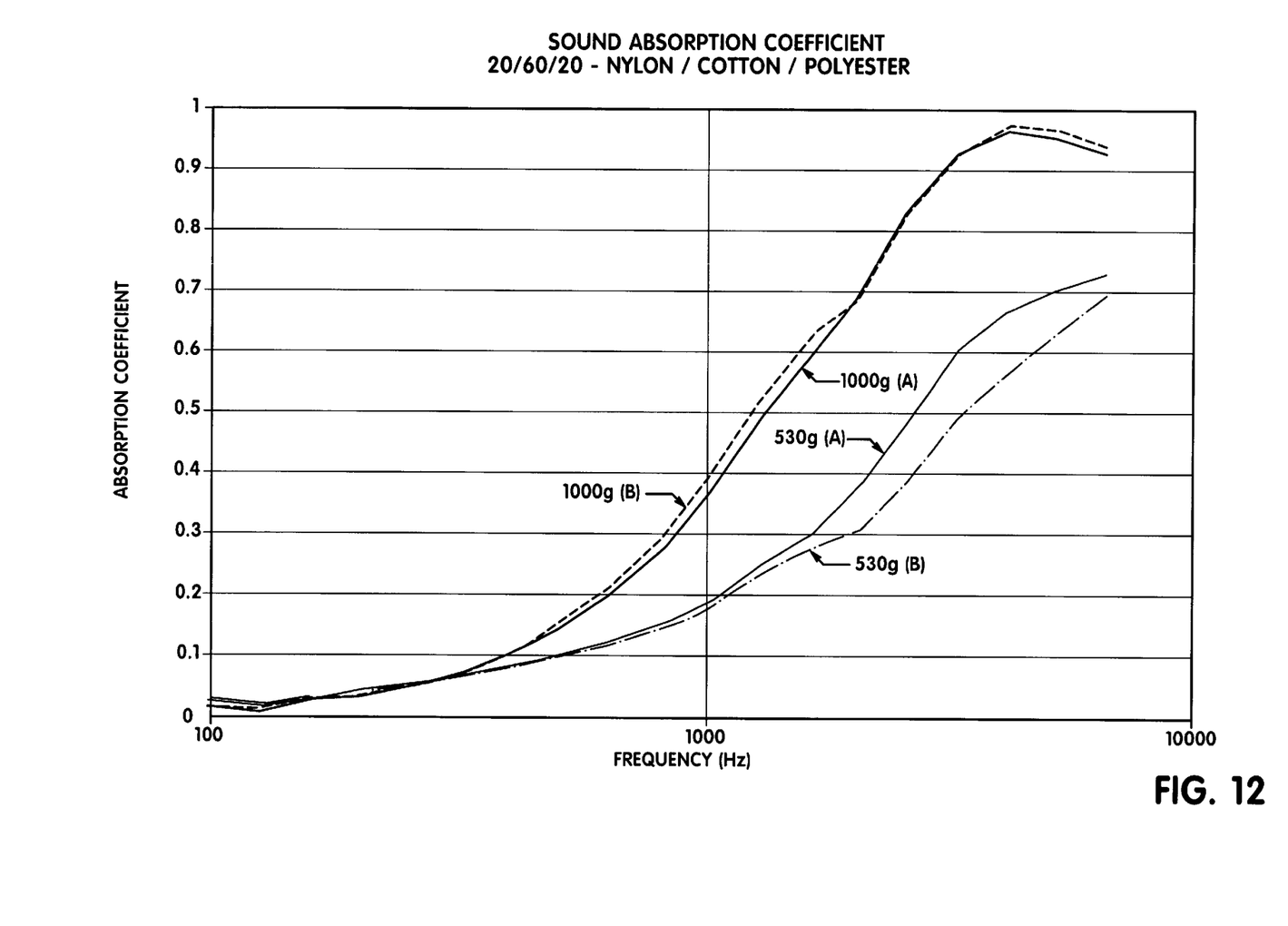
FIG. 12 illustrates a graph comparing the sound absorption coefficients of lightweight and heavyweight pleated materials of the present invention formed of nylon/cotton/polyester fibers.

FIG. 12 compares two 530 gram/m² samples of the invention with two 1000 gram/M² samples of the invention. The pleated nonwoven product specifically comprised nylon fibers (20 weight percent), cotton fibers (60 weight percent) and polyester fibers (20 weight percent). FIG. 12 illustrates that the increase of the lower cost cotton fiber content to 60% does not reduce the sound absorption characteristics. Therefore, it is possible to optimize the cost of the product based on performance characteristics other than sound absorption.

Figure 13:
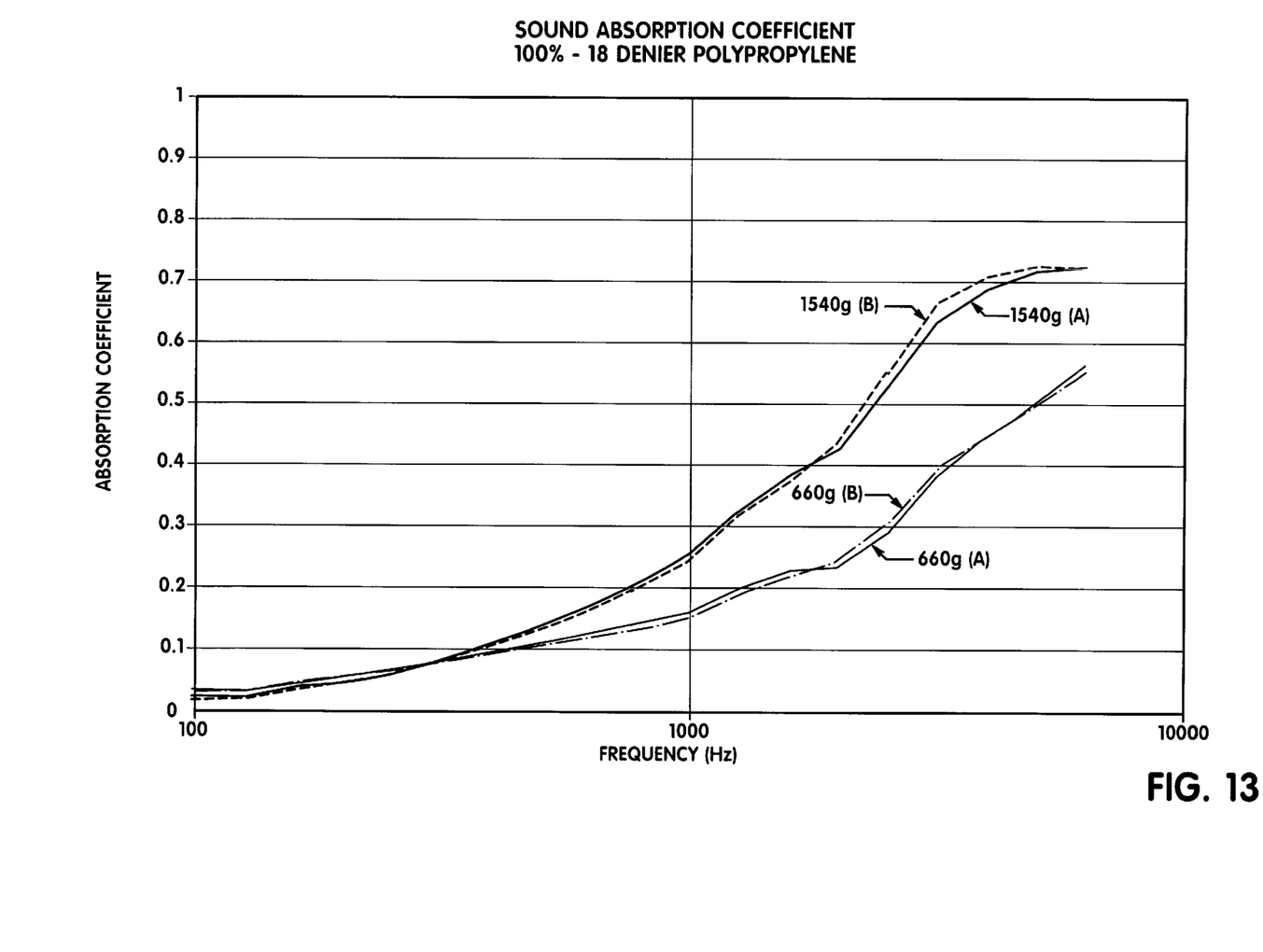
FIG. 13 illustrates a graph comparing the sound absorption coefficients of lightweight and heavyweight pleated materials constructed in accordance with the invention formed of polypropylene fibers.

FIG. 13 compares two 660 gram/m² samples of the invention with two 1540 gram/m² samples of the invention. The pleated nonwoven product specifically comprised 18 denier polypropylene (100 weight percent). This evaluation of polypropylene was performed to compare the sound absorption characteristics thereof to the polyester product and to the similar products containing natural fibers.

While the present invention has been illustrated by a description of various embodiments and while these embodiments have been described in some detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method as shown and described. This has been a description of the present invention, along with the preferred methods of practicing the present invention as currently known.

However, the invention itself should only be defined by the appended claims, wherein I claim:

1. A fibrous, multi-layered carpet product comprising:
   a fibrous web formed into a plurality of pleats bound together and having lengthwise portions extending perpendicularly between adjacent folds in said fibrous web, said folds forming opposite top and bottom faces for directing compressive forces into the plurality of pleats, wherein the fibrous web consists substantially of fibers extending vertically between the opposite top and bottom faces within the pleats to enhance the resiliency and sound absorption characteristics of the fibrous web, and
   a tufted carpet layer secured to the top face.

2. The product of claim 1, wherein at least about 70% of said fibers extend vertically between the opposite faces and about 30% of said fibers extend transversely thereto and generally along the length of each pleat.

3. The product of claim 1, wherein at least about 90% of said fibers extend vertically between the opposite faces.

4. The product of claim 1 further including a permanently compressed region in the pleats.

5. The product of claim 1, wherein the fibers are formed of materials including at least one of polyethylene, polyester, polypropylene, nylon, and cotton.

6. The product of claim 5 further including a binder in the fibrous web.

7. The product of claim 6, wherein the binder is a fibrous binder.

8. The product of claim 1 further comprising a thermoplastic backing layer between the fibrous carpet layer and the fibrous web, the thermoplastic backing layer allowing the product to be thermally molded into a three dimensional configuration.

* * * * *

UNITED STATES PATENT AND TRADEMARK OFFICE
CERTIFICATE OF CORRECTION

PATENT NO. : 6,534,145 B1  
DATED : March 18, 2003  
INVENTOR(S) : David Boyles

It is certified that error appears in the above-identified patent and that said Letters Patent is hereby corrected as shown below:

<u>Column 5,</u>
Line 38, "0% co-polyester" should be -- 20% co-polyester --

Signed and Sealed this

Thirteenth Day of January, 2004

JON W. DUDAS
*Acting Director of the United States Patent and Trademark Office*